United States Patent [19]
Bardon et al.

[11] Patent Number: 5,757,380
[45] Date of Patent: May 26, 1998

[54] INFORMATION HANDLING SYSTEM, METHOD AND ARTICLE OF MANUFACTURE INCLUDING CONTEXT SPECIFIC ERASER/UNDO TOOL

[75] Inventors: Didier Bardon, Austin; Richard Edmond Berry; Scott Harlan Isensee, both of Georgetown; Shirley Lynn Martin; John Martin Mullaly, both of Austin, all of Tex.

[73] Assignee: International Business Machines Corporation, Armonk, N.Y.

[21] Appl. No.: 588,671

[22] Filed: Jan. 17, 1996

[51] Int. Cl.⁶ ............................................. G06F 15/00
[52] U.S. Cl. ............................................. 345/435
[58] Field of Search ...................... 395/135, 133, 395/113, 114; 345/435, 433

[56] References Cited

U.S. PATENT DOCUMENTS 5,513,300 4/1996 Shibazaki ........................ 395/112

*Primary Examiner*—Phu K. Nguyen
*Attorney, Agent, or Firm*—Jenkens & Gilchrist; George E. Clark; Mark S. Walker

[57] ABSTRACT

The invention is an information handling system, which includes one or more processing units, a memory system, and one or more I/O controllers all connected to a system bus, the I/O controllers controlling various input/output devices such as a keyboard, a mouse, a display device, communications adapters and the like, and an operating system program for controlling the processors, the memory system, and the I/O controllers, which provides a user interface, one or more tools which may be represented by objects on a tool bar or the like presented on the display device by the user interface, and an eraser/undo tool for erasing a portion of an existing image presented on the display device by the user interface by direct application of the object representing an eraser tool to the portion of the image to be erased, such that marks previously obscured reappear in the areas to which the eraser tool has been applied.

32 Claims, 6 Drawing Sheets

5,757,380

INFORMATION HANDLING SYSTEM, METHOD AND ARTICLE OF MANUFACTURE INCLUDING CONTEXT SPECIFIC ERASER/UNDO TOOL

TECHNICAL FIELD OF THE INVENTION

The present invention relates to information handling systems, and methods and articles of manufacture for use with information handling systems, and more particularly to information handling systems, and methods and articles of manufacture for use with information handling systems including a context specific eraser/undo tool.

BACKGROUND OF THE INVENTION

Most current computer graphics programs, such as so-called "paint programs", provide tools for the user called, for example, "pens" or "paintbrushes" for creating images on a display device. When these tools are used they affect the image on the display device by replacing anything previously drawn at the location where the tool is being used with a new color and/or shape as selected by the user of the tool. The overwritten portions of the previous image on the display device are not retained in memory and are not retrievable.

The current computer graphics programs also typically include an eraser tool which clears any portion of the image to which it is applied. Use of the eraser tool results in a "hole" in the image-since the prior image was not preserved, the blank user interface screen generated by the computer graphics program and/or operating system reappears in the display device where the eraser tool was applied.

Often, however, the user of the eraser tool would prefer to have a prior image reappear rather than the blank user interface screen generated by the computer graphics program and/or operating system when the eraser tool is applied to a portion of an existing image. The current computer graphics programs require the user to recreate the prior image to fill in the holes left by the use of the eraser tool. Such reconstruction can be tedious and time-consuming for the user.

There is a need for an eraser tool for use in computer graphics programs that, when the eraser tool is used to erase a particular selected portion of an image, the prior image that was in that location reappears.

SUMMARY OF THE INVENTION

Therefore, it is an object of the present invention to provide an eraser tool for use with computer graphics programs presented on a user interface in an information handling system which allows a prior image to reappear when the eraser tool is applied to a portion of an existing image.

Accordingly, an information handling system is provided which includes one or more processing units, a memory system, and one or more I/O controllers all connected to a system bus, the I/O controllers controlling various input/output devices such as a keyboard, a mouse, a display device, communications adapters and the like, and an operating system program for controlling the processors, the memory system, and the I/O controllers, the operating system program such as OS/2 which is a product of International Business Machines corporation ("IBM") (OS/2 is a registered trademark of IBM), which provides a user interface, one or more tools which may be represented by objects on a tool bar or the like presented on the display device by the user interface, and means for erasing a portion of an existing image presented on the display device by the user interface by direct application of the object representing an eraser tool to the portion of the image to be erased, such that a prior image reappears in the areas to which the eraser tool has been applied.

It is an advantage of the present invention that prior images on a user interface in an information handling system may be directly and efficiently recovered when an eraser tool is used to erase a portion of an existing image.

It is a further advantage of the present invention that the steps used to erase a portion of an existing image on a user interface in an information handling system correspond to the steps that would be required to erase a portion of an image created using actual pens on paper or using overhead transparencies.

Other features and advantages of the present invention will become apparent in the following detailed description of the preferred embodiment of the invention taken in conjunction with the accompanying drawings.

DETAILED DESCRIPTION OF A PREFERRED EMBODIMENT OF THE INVENTION

Figure 1:
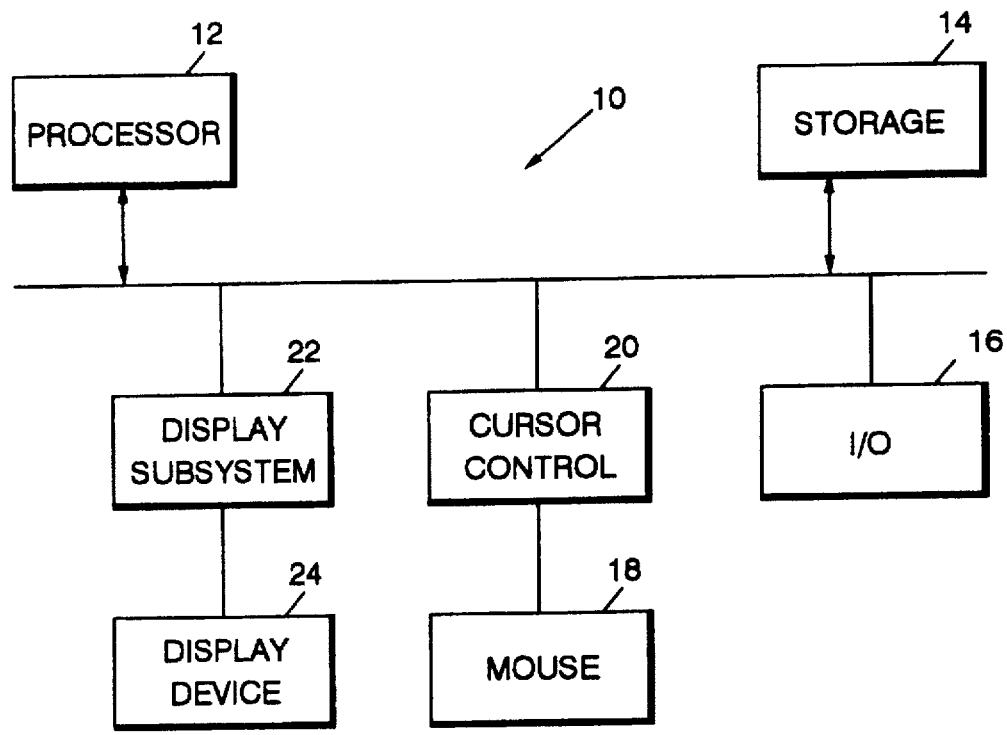
FIG. 1 is a block diagram of an information handling system implementing the present invention.

Referring now to FIG. 1, an information handling system implementing the present invention will be described.

Information handling systems 10 can include one or more processing units 12, a memory storage system 14, one or more I/O controllers 16 which connect to I/O devices, to a cursor control system 20, including a mouse 18, and to a display subsystem 22, including a display device 24.

Each of the units identified above are well known in the art and will not be described in greater detail herein.

Figure 2:
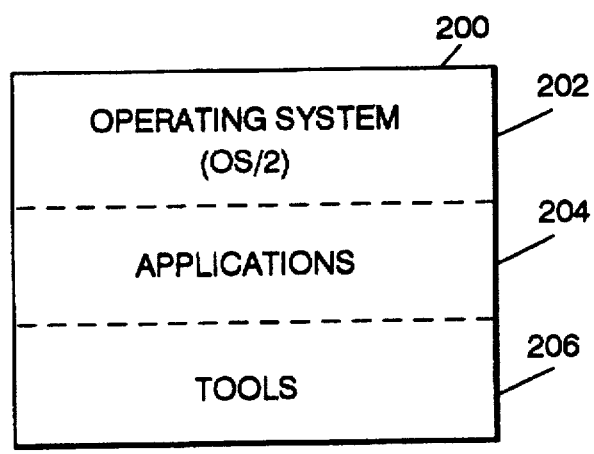
FIG. 2 is a schematic diagram of an operating system environment in accordance with the present invention.

Referring now to FIG. 2, the operating system environment in accordance with the present invention will be further described.

Operating system environment 200 includes an operating system 202 such as the IBM OS/2 operating system, one or more applications programs 204, and one or more tools 206. The user interface (see FIG. 3) and the objects presented at the user interface may be generated either by operating system 202 or application program 204 for a user interface and tools for a specific application program such as a computer graphics program (see FIG. 3).

Figure 3:
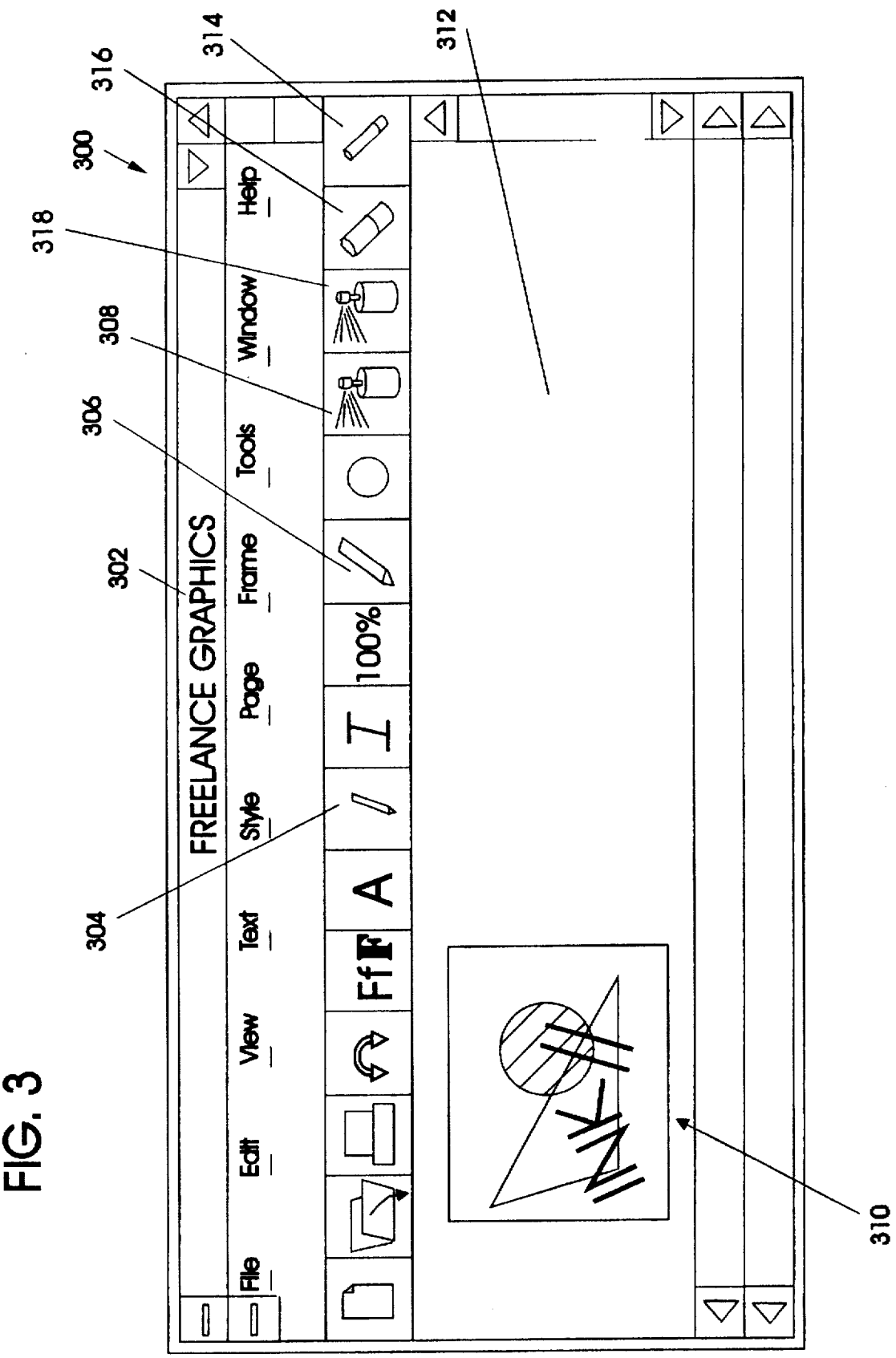
FIG. 3 is a pictorial representation of a display device showing an image to be modified in accordance with the present invention.

Referring now to FIG. 3, an example of a user interface in which the present invention may be applied will be described. An application window 300 includes a title bar 302 which identifies the application program being executed, one or more objects 304 (for thin blue pen drawing tool), 306 (for thick black pen drawing tool), 308 (for gray spray paint drawing tool) representing drawing tools which may be used to draw specific images in application window 300, such as graphics image 310, a graphics window 312, and one or more objects, 314 (for thin blue pen eraser tool), 316 (for thick black pen eraser tool), 318 (for gray spray paint eraser tool) representing eraser tools which may be used to erase any portion of the graphics image 310 created by drawing tools 304, 306 or 308.

The user of the application program selects the appropriate drawing tools to create the graphics image 310 shown in FIG. 3 by moving the cursor to the desired tool object and clicking on the tool and then dragging the selected tool to the graphics window 312 and using the mouse 18 or arrow keys on the computer keyboard to move the selected drawing tool to create the desired image. For example, to create the graphics image 310, the user would first select the thin blue pen drawing tool by clicking with the mouse 18 on object 304, dragging the tool to the graphics window 312 and manipulating the tool to draw the triangle shape of graphics image 310. The user then would select the thick black pen drawing tool by clicking with the mouse 18 on object 306, dragging the tool to the graphics window 312 and manipulating the tool to write the word "INK" as shown in graphics image 310. The user then would select the gray spray paint drawing tool by clicking with the mouse 18 on object 308 and dragging the tool to the graphics window 312 and manipulating the tool to create the shaded circle as shown in graphics image 310. Finally, the user would again select the thick black pen drawing tool by clicking with the mouse 18 on object 306, dragging the tool to the graphics window 312 and manipulating the tool to draw the two dark lines as shown in graphics image 310.

Figure 4:
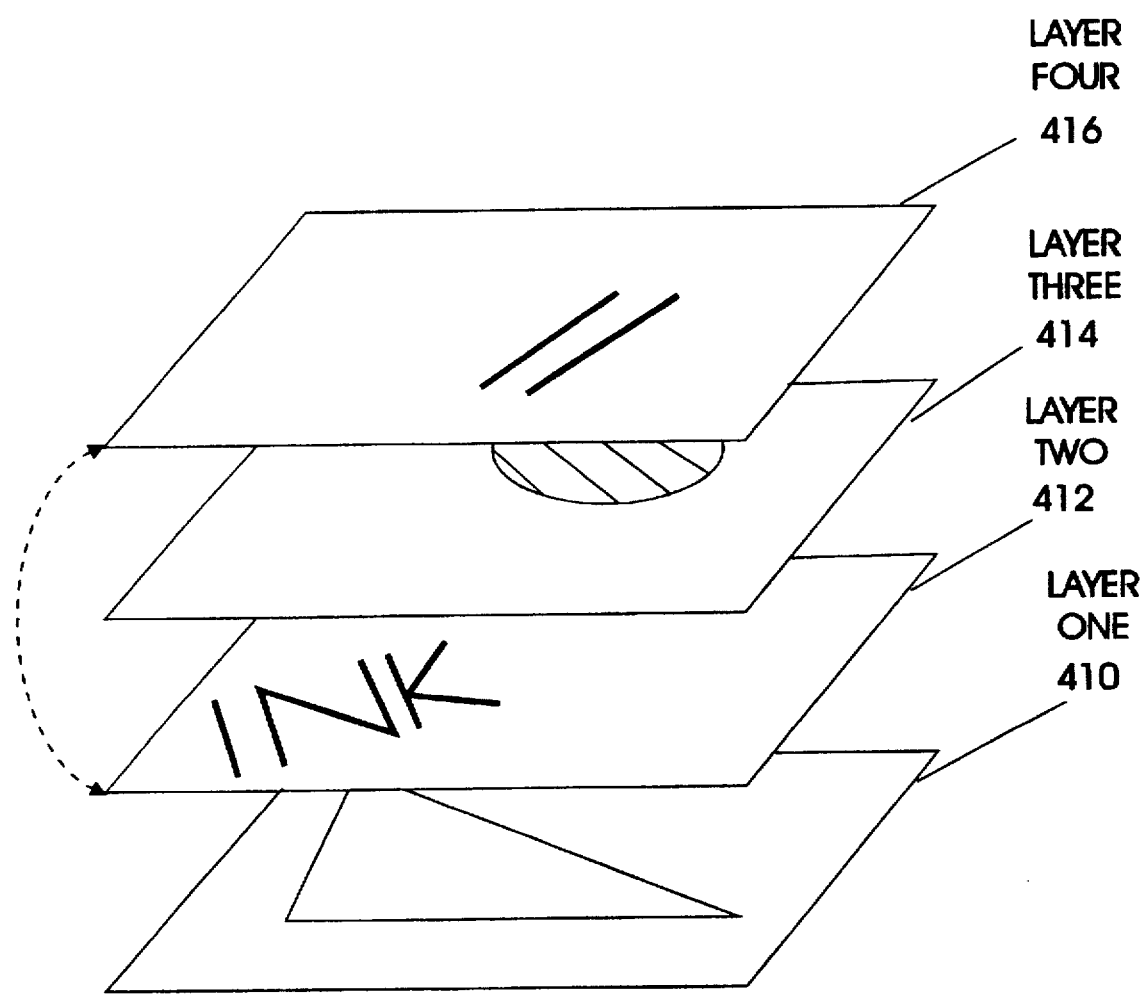
FIG. 4 is a pictorial representation of an image to be modified in accordance with the present invention showing the layers created by the application program as each drawing tool is used to create the image on the display device of FIG. 3.

FIG. 4 shows the layers created by the application program 204 as each drawing tool is applied to create the graphics image 310. When the user selects the thin blue pen drawing tool, represented by object 304, the application creates Layer One 410. The application similarly creates a Layer Two 412, Layer Three 414, and Layer Four 416 each time an object is selected representing a drawing tool. Note that a new Layer Four 416 is created for the second use of the thick black pen tool. Layer Two 412 is not brought back to the top for the second use of the thick black pen tool. The layers described in this preferred embodiment thus are selection specific, not drawing tool specific. The layers could be drawing tool specific, however, and would still be within the scope of the invention. Each layer that is created is transparent except for the pixels applied by the selected tool. For example, Layer One 410 is transparent except for the blue pixels applied in a triangle shape by the thin blue pen drawing tool. Correspondingly, Layer Two 412 is transparent except for the black pixels applied by the thick black pen drawing tool, and so on.

Figure 5:
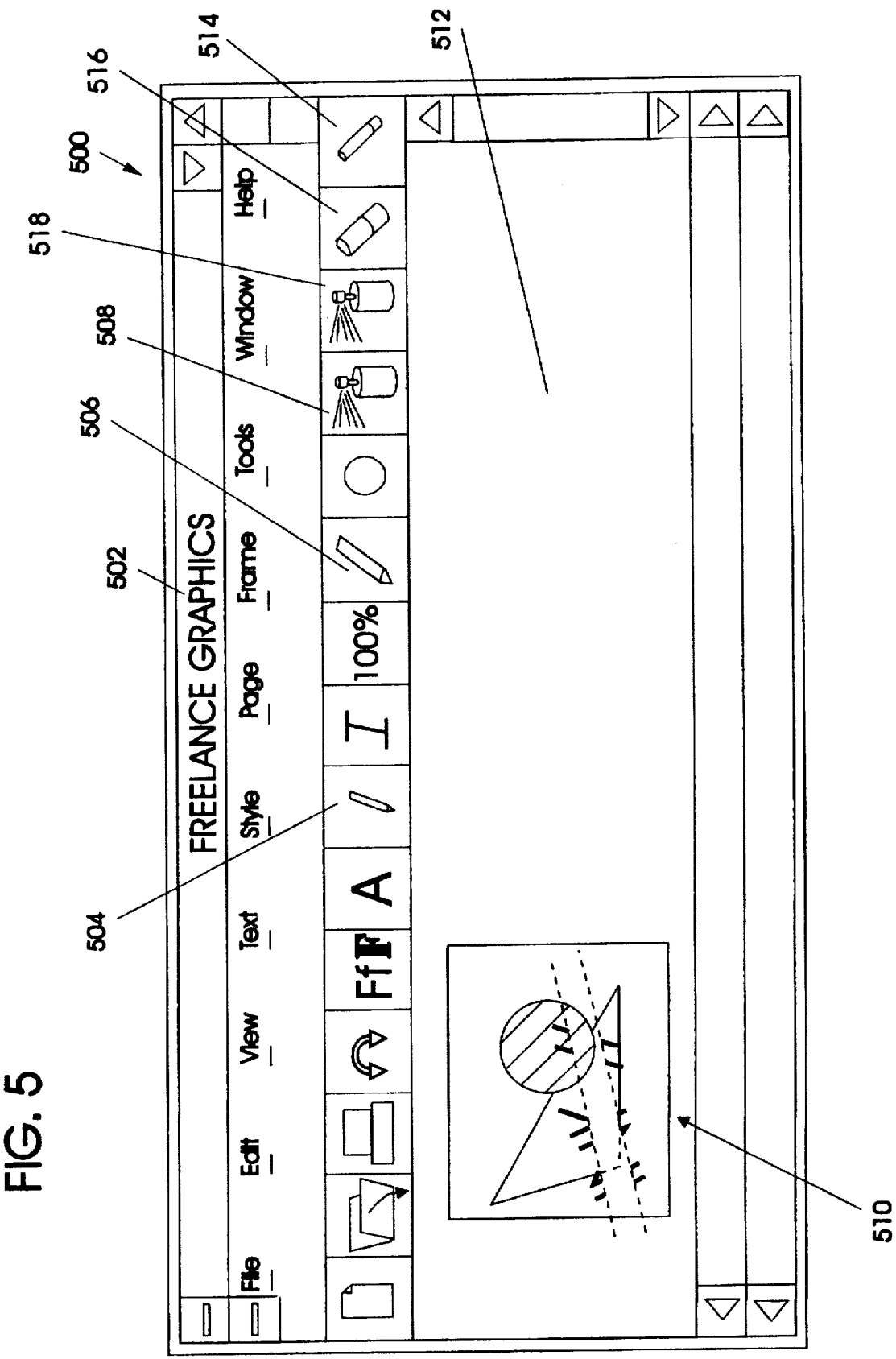
FIG. 5 is a pictorial representation of a display device showing an image after it has been modified in accordance with the present invention.

FIG. 5 is a pictorial representation of a display device showing the graphics image 310 after it has been modified in accord with the present invention. To create graphics image 510, the user selects object 316 representing the thick black pen eraser tool. In an alternative embodiment of the invention, the user could choose a generic eraser tool from a tool bar and then choose a thick black pen eraser tool from a palette that would pop-up showing those drawing tools used to create the graphics image to be modified. The cursor may be modified to the shape of an eraser to show an eraser tool has been selected. To select object 316, the user clicks on the object 316 with the mouse 18 and drags the eraser tool in the graphics window 312 across the graphics image 310 to erase the undesired portions of the graphics image 310. The thick black pen eraser tool erases portions of the thick black pen parts of the graphics image 310, leaving the resulting graphics image 510 shown in FIG. 5. In applying the thick black pen eraser tool it is not necessary to first select the portion of the graphics image 310 to be erased. The eraser tool is simply applied directly to the graphics image 310 and moved over the graphics image 310 to erase the undesired portions of the graphics image 310. FIG. 5 shows a horizontal sweep of the eraser tool across the graphics image 310, but the invention encompasses within its scope great flexibility in terms of applying the eraser tool to the image. Any sort of motion of the thick black pen eraser tool will result in erasure of any portions of the graphics image 310 created with the thick black pen drawing tool over which the thick black pen eraser tool passes.

Figure 6:
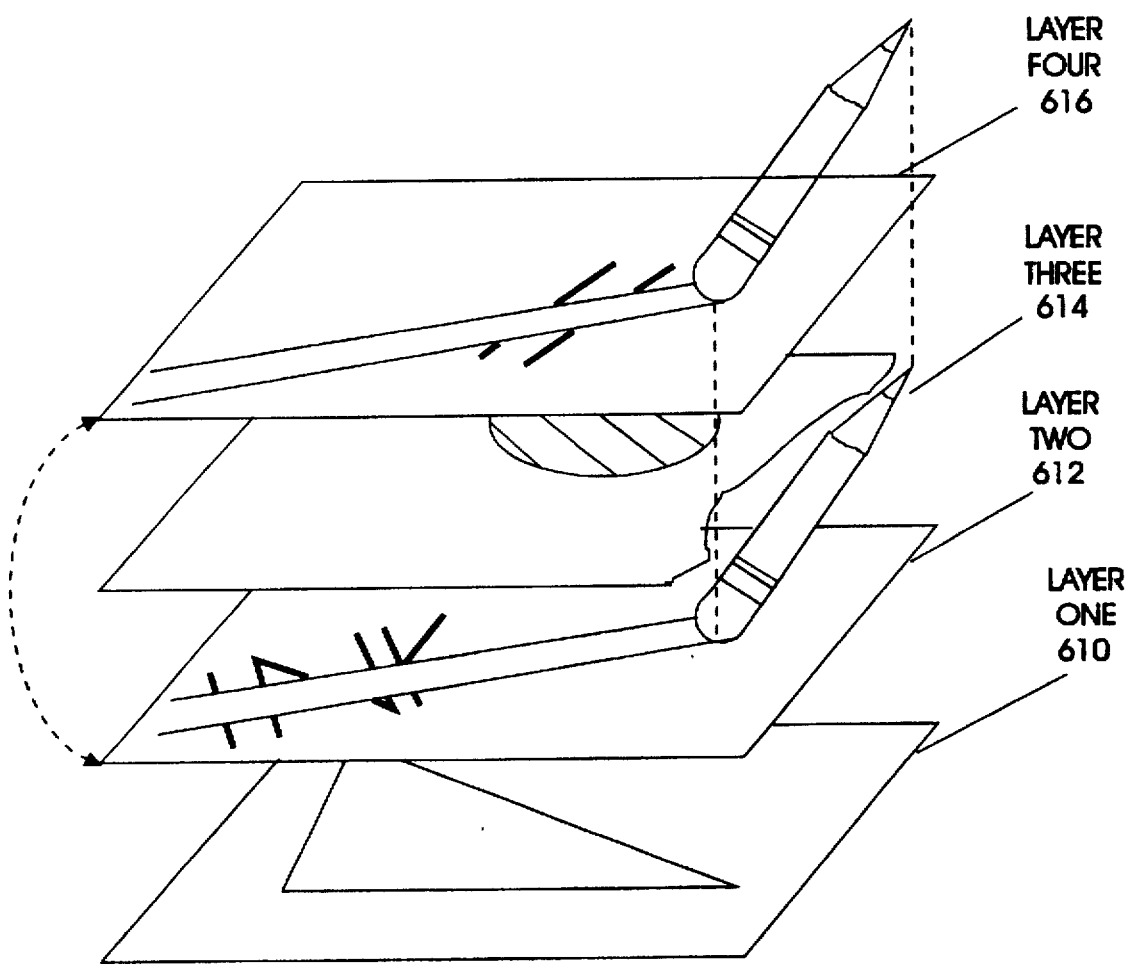
FIG. 6 is a pictorial representation of an image after it has been modified in accordance with the present invention showing the effect of the application program of an eraser tool to the layers created by the application.

FIG. 6 shows the effect of the application of an eraser tool of the present invention to the layers created by the application program 204. Every black pixel that was created by the thick black pen drawing tool is changed to a transparent pixel in portions of graphics image 310 to which the thick black pen eraser tool is applied. As shown in FIG. 6, both Layer Two 612 and Layer Four 616 are affected by the thick black pen eraser tool. Layer One 610 and Layer Three 614 are not affected since the thick black pen tool was not selected for those layers. The eraser tool of the present invention thus is context specific. Once the thick black pen eraser tool is applied, the affected pixels in Layer Two 612 and Layer Four 616 change in state and become transparent, revealing the pixels of Layer Three 614 and Layer One 610. Note that the eraser tools of the preferred embodiment of the present invention are drawing tool specific rather than layer specific. However, the eraser tools could be layer specific and still be within the scope of the invention.

Figure 7:
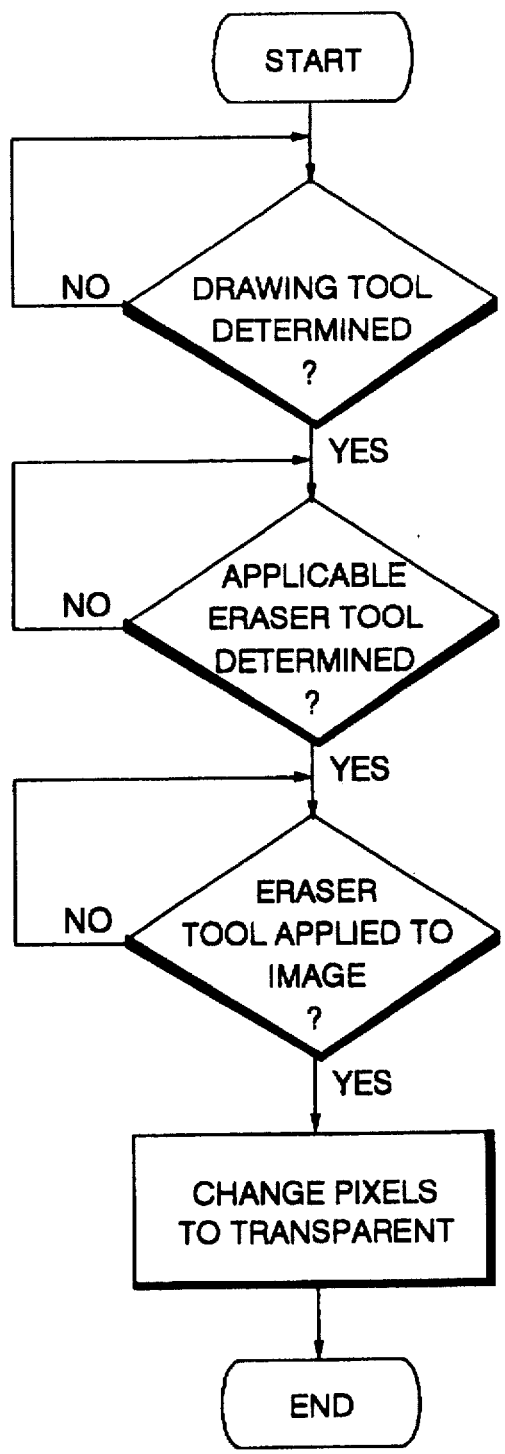
FIG. 7 is a flow chart showing the operation of a preferred embodiment of the present invention.

FIG. 7 is a flow chart showing the operation of a preferred embodiment of the present invention. When the user desires to erase a portion of an existing image in a user interface, the user first must determine what drawing tool was used to create the portion of the image to be erased. Once the drawing tool is determined, the user must select the eraser tool that corresponds to that drawing tool. The eraser tool may be selected by moving the cursor to the eraser tool and selecting the eraser tool by depressing the mouse button to load the tool for use on an image in the application window shown on the display device. The cursor, which may be modified to a special symbol such as an eraser to indicate that an eraser tool has been loaded, is then applied to the portion of the image to be erased. An object select action such as depressing the mouse button is then taken to apply the eraser tool to the image on the display device to be modified. The cursor is then dragged, with the select button depressed, across the image to be modified to remove the undesired portions of the image, and at the end of the portion to be modified, the cursor select button is released. The movement of the eraser tool across the image results in a change in the state of the pixels created by the corresponding drawing tool to transparent such that a prior image is again revealed.

It should be understood that although the invention is being described with reference to a computer graphics application program herein, the invention would apply equally to any other application program having images to be modified, including a word processing program in which it is desired to change a font to be used.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:
   one or more processing units;
   a memory storage system;
   one or more I/O controllers for controlling one or more I/O devices;
   a system bus connecting the processors, the memory storage system and the I/O controllers;
   an operating system control means for controlling operation of the processors, the memory storage system and the I/O controllers;
   one or more image creation means for creating images associated with the operating system control means;
   one or more image modification means for modifying one or more portions of an image associated with the operating system control means;
   means for selecting one of the one or more image modification means corresponding to the image creation means used to create the one or more portions of the image to be modified; and
   means for applying the selected image modification means to the one or more portions of the image to be modified such that markings made by other image creation means and previously obscured by the image creation means corresponding to the image modification means reappear in the one or more portions of the image to which the image modification means has been applied.

2. An information handling system, according to claim 1, wherein at least one of the image modification means comprises one or more image erasure means.

3. An information handling system, according to claim 1, further comprising:
   one or more application programs operating under control of the operating system control means.

4. An information handling system, according to claim 1, further comprising:
   a display device connected to one of the I/O controllers for displaying a user interface representation of the image and the image modification means.

5. An information handling system, comprising:
   one or more processing units;
   a memory storage system;
   one or more I/O controllers for controlling one or more I/O devices;
   a system bus connecting the processors, the memory storage system and the I/O controllers;
   an operating system control means for controlling operation of the processors, the memory storage system and the I/O controllers;
   one or more image drawing means for drawing one or more portions of an image associated with the operating system control means;
   one or more image modification means corresponding to each of the one or more image drawing means for modifying one or more portions of the image associated with the operating system control means;
   means for selecting one or more image drawing means;
   means for creating a layer of pixels each time an image drawing means is selected;
   means for applying one or more selected image drawing means to draw an image;
   means for selecting one or more image modification means; and
   means for applying the selected image modification means to the one or more portions of the image to be modified such that where the image modification means is applied, the pixels in the layers created by selection of an image drawing means corresponding to the image modification means are changed to transparent, thereby revealing other prior layers.

6. An information handling system, according to claim 5, wherein at least one of the image modification means comprises one or more image erasure means.

7. An information handling system, according to claim 5, further comprising:
   one or more application programs operating under control of the operating system control means.

8. An information handling system, according to claim 5, further comprising:
   a display device connected to one of the I/O controllers for displaying a user interface representation of the image and the image modification means.

9. An information handling system, comprising:
   one or more processing units;
   a memory storage system;
   one or more I/O controllers for controlling one or more I/O devices;
   a system bus connecting the processors, the memory storage system and the I/O controllers;
   an operating system control means for controlling operation of the processors, the memory storage system and the I/O controllers;
   one or more image drawing means for drawing one or more portions of an image associated with the operating system control means;
   one or more image modification means corresponding to each of the one or more image drawing means for modifying one or more portions of the image associated with the operating system control means;
   means for selecting one or more image drawing means;
   means for creating a layer of pixels for each different image drawing means that is selected;
   means for applying one or more selected image drawing means to draw an image;
   means for selecting one or more image modification means; and
   means for applying the selected image modification means to the one or more portions of the image to be modified such that where the image modification means is applied, the pixels in the layer created for the image drawing means corresponding to the image modification means are changed to transparent, thereby revealing other prior layers.

10. An information handling system, according to claim 9, wherein at least one of the image modification means comprises one or more image erasure means.

11. An information handling system, according to claim 9, further comprising:

one or more application programs operating under control of the operating system control means.

12. An information handling system, according to claim 9, further comprising:
a display device connected to one of the I/O controllers for displaying a user interface representation of the image and the image modification means.

13. A method for selectively modifying a portion of an image displayed in an information handling system, comprising the steps of:
determining which of one or more drawing means was used to draw the portion of the image to be modified;
second selecting an image modification means that will modify images created by the drawing means used to create the portion of the image to be modified; and
third applying the image modification means to the portion of the image to be modified such that markings made by other drawing means and previously obscured by the drawing means corresponding to the image modification means reappear in the portion of the image to which the image modification means has been applied.

14. A method for selectively modifying a portion of an image in an information handling system, according to claim 13, wherein the selecting step further comprises the step of:
selecting an image modification means that will erase images created by the drawing means used to create the portion of the image to be erased.

15. A method for selectively modifying a portion of an image in an information handling system, according to claim 13, wherein the applying step further comprises the step of:
dragging an object representing an image modification means across the portion of the image to be modified.

16. A method for selectively modifying a portion of an image in an information handling system, according to claim 13, wherein the selecting step further comprises the steps of:
moving a cursor to an object representing the image modification means; and
loading the image modification means into a temporary storage.

17. A method for selectively modifying a portion of an image in an information handling system, according to claim 13, further comprising the step of:
changing a state of each pixel comprising the portion of the image to which the image modification means has been applied.

18. A method for modifying a portion of an image in an information handling system, according to claim 13, further comprising the step of:
changing to transparent each pixel comprising the portion of the image to which the image modification means has been applied.

19. An article of manufacture to be used in a computer system, comprising:
A computer readable medium, comprising:
one or more image modification means for modifying one or more portions of an image associated with an operating system control means;
means for selecting one of the one or more image modification means; and
means for applying the selected image modification means to the one or more portions of the image to be modified such that a prior image reappears in the one or more portions of the image to which the image modification means has been applied.

20. An article of manufacture, according to claim 19, further comprising:
one or more image modification means for modifying one or more portions of an image associated with an application program.

21. An article of manufacture to be used in a computer system, comprising:
A computer readable medium, comprising:
one or more image drawing means for drawing one or more portions of an image associated with the operating system control means;
one or more image modification means corresponding to each of the one or more image drawing means for modifying one or more portions of the image associated with the operating system control means;
means for selecting one or more image drawing means;
means for creating a layer of pixels each time an image drawing means is selected;
means for applying one or more selected image drawing means to draw an image;
means for selecting one or more image modification means; and
means for applying the selected image modification means to the one or more portions of the image to be modified such that where the image modification means is applied, the pixels in the layers created by selection of an image drawing means corresponding to the image modification means are changed to transparent, thereby revealing other prior layers.

22. An article of manufacture, according to claim 21, wherein at least one of the image modification means comprises one or more image erasure means.

23. An article of manufacture, according to claim 21, further comprising:
one or more image modification means for modifying one or more portions of an image associated with an application program.

24. An article of manufacture to be used in a computer system, comprising:
A computer readable medium, comprising:
one or more image drawing means for drawing one or more portions of an image associated with the operating system control means;
one or more image modification means corresponding to each of the one or more image drawing means for modifying one or more portions of the image associated with the operating system control means;
means for selecting one or more image drawing means;
means for creating a layer of pixels for each different image drawing means that is selected;
means for applying one or more selected image drawing means to draw an image;
means for selecting one or more image modification means; and
means for applying the selected image modification means to the one or more portions of the image to be modified such that where the image modification means is applied, the pixels in the layer created for the image drawing means corresponding to the image modification means are changed to transparent, thereby revealing other prior layers.

25. An article of manufacture, according to claim 24, wherein at least one of the image modification means comprises one or more image erasure means.

26. An article of manufacture, according to claim 24, further comprising:

one or more image modification means for modifying one or more portions of an image associated with an application program.

27. An article of manufacture, comprising:

A computer readable medium, comprising:

means for determining which of one or more drawing means was used to draw a portion of an image to be modified;

means for selecting an image modification means that will modify images created by the drawing means used to create the portion of the image to be modified; and means for applying the image modification means to the portion of the image to be modified such that a prior image reappears in the portion of the image to which the image modification means has been applied.

28. An article of manufacture, according to claim 27, wherein at least one of the image modification means comprises one or more image erasure means.

29. An article of manufacture, according to claim 27, further comprising:

means for dragging an object representing an image modification means across the portion of the image to be modified.

30. An article of manufacture, according to claim 27, further comprising:

means for moving a cursor to an object representing the image modification means; and means for loading the image modification means into a temporary storage.

31. An article of manufacture, according to claim 27, further comprising:

means for changing a state of each pixel comprising the portion of the image to which the image modification means has been applied.

32. An article of manufacture, according to claim 27, further comprising:

means for changing to transparent each pixel comprising the portion of the image to which the image modification means has been applied.

* * * * *